US010636383B2

(12) United States Patent
Zhang

(10) Patent No.: US 10,636,383 B2
(45) Date of Patent: Apr. 28, 2020

(54) METHOD, APPARATUS AND DEVICE FOR ADJUSTING SCREEN COLOR AND STORAGE MEDIUM

(71) Applicant: Beijing Xiaomi Mobile Software Co., Ltd., Beijing (CN)

(72) Inventor: Yuan Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/961,141

(22) Filed: Apr. 24, 2018

(65) Prior Publication Data

US 2018/0308452 A1 Oct. 25, 2018

(30) Foreign Application Priority Data

Apr. 24, 2017 (CN) .......................... 2017 1 0271582

(51) Int. Cl.

*G09G 5/02* (2006.01)
*G09G 5/10* (2006.01)
*G09G 3/20* (2006.01)
*H04N 1/60* (2006.01)
*H04N 5/202* (2006.01)

(Continued)

(52) U.S. Cl.

CPC ........... *G09G 5/024* (2013.01); *G09G 3/2003* (2013.01); *G09G 5/02* (2013.01); *G09G 5/10* (2013.01); *G09G 2320/0242* (2013.01); *G09G 2320/0276* (2013.01); *G09G 2320/0626* (2013.01); *G09G 2320/0666* (2013.01); *G09G 2320/0673* (2013.01); *G09G 2340/06* (2013.01)

(58) Field of Classification Search

CPC combination set(s) only.
See application file for complete search history.

(56) References Cited

U.S. PATENT DOCUMENTS

2009/0128578 A1 5/2009 Feng
2013/0155120 A1 6/2013 Kang (Continued)

FOREIGN PATENT DOCUMENTS

CN 103426391 A 12/2013
CN 205282055 U 6/2016

OTHER PUBLICATIONS

Chinese Office Action dated Sep. 28, 2018, in Patent Application No. 201710271582.0, 13 pages (with English translation).

(Continued)

*Primary Examiner* — Wesner Sajous
(74) *Attorney, Agent, or Firm* — Oblon, McClelland, Maier & Neustadt, L.L.P.

(57) ABSTRACT

The disclosure relates to a method, an apparatus, a device for adjusting screen color, and a storage medium. The method includes obtaining target optical parameters for representing a color space of a screen; calculating a target set of R, G, B components of a target white point based on the target optical parameters; comparing the target set of R, G, B components with a current set of R, G, B components of a current white point of the screen; obtaining adjustment data for the current set of R, G, B components, respectively, based on the comparison; and when the screen is displaying, adjusting the current set of R, G, B components of the screen based on the adjustment data for the current set of R, G, B components.

17 Claims, 8 Drawing Sheets

(51) Int. Cl.

| | |
|---|---|
| ***H04N 5/57*** | (2006.01) |
| ***H04N 9/64*** | (2006.01) |

(56) References Cited

U.S. PATENT DOCUMENTS

| | | | | |
|---|---|---|---|---|
| 2014/0267785 | A1* | 9/2014 | Chen | H04N 17/02<br>348/189 |
| 2014/0333660 | A1* | 11/2014 | Ballestad | G09G 5/00<br>345/593 |
| 2016/0358584 | A1* | 12/2016 | Greenebaum | G09G 5/02 |
| 2017/0092229 | A1* | 3/2017 | Greenebaum | G09G 5/10 |
| 2017/0124928 | A1* | 5/2017 | Edwin | G02B 27/01 |

OTHER PUBLICATIONS

Extended European Search Report dated Aug. 1. 2018 in corresponding European Patent Application No. 18168854.0, 13 pages.

* cited by examiner

METHOD, APPARATUS AND DEVICE FOR ADJUSTING SCREEN COLOR AND STORAGE MEDIUM

CROSS REFERENCE TO RELATED APPLICATION

This application is based on and claims priority to Chinese Patent Application Serial No. 201710271582.0, filed with the State Intellectual Property Office of P. R. China on Apr. 24, 2017, the entire contents of which are incorporated herein by reference.

TECHNICAL FIELD

The present disclosure generally relates to the field of display technology, and more particularly, to a method, an apparatus, a device for adjusting screen color, and a storage medium.

BACKGROUND

With developments of science and technology, electronic devices with display screens are becoming more and more popular with users, and users' requirements on displaying effect of the display screen are getting higher and higher. The displaying effect of a white color usually has a great impact on color accuracy. Therefore, the screen color may be adjusted by adjusting a chromaticity value of the white point in a color space.

A gamma value generally indicates a nonlinear relationship between a luminance of the screen and an input voltage. There is a corresponding relationship between the gamma value and a target white point, i.e., the gamma value varies with the target white point. The term "target white point" may refer to a white point with its chromaticity value corresponding to a target chromaticity value. Therefore, the white point of the screen may be adjusted to be close to the target white point by controlling the luminance through the voltage. Currently, a voltage parameter corresponding to the gamma value when the white point of the screen reaches the target white point may be burned into a screen driver IC. The electronic device may invoke the voltage parameter and adjust the voltage accordingly so as to adjust the white point in the color space of the screen to the target white point, thus realizing the color adjusting of the screen.

However, the target white point varies with the user because the user vary based on preference. Further an amount of data burned in the screen driver IC is limited, and the burned data is fixed, i.e., the target white point is fixed, such that the target white point cannot be adjusted flexibly.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for adjusting screen color. The method includes obtaining target optical parameters for representing a color space of a screen; calculating a target set of R, G, B components of a target white point based on the target optical parameters; comparing the target set of R, G, B components with a current set of R, G, B components of a current white point of the screen; obtaining adjustment data for the current set of R, G, B components, respectively, based on the comparison; and when the screen is displaying, adjusting the current set of R, G, B components of the screen based on the adjustment data for the current set of R, G, B components.

In an example, the target optical parameters include a first chromaticity coordinate when a red color is displaying on the screen, a second chromaticity coordinate when a blue color is displaying on the screen, a third chromaticity coordinate when a green color is displaying on the screen, a fourth chromaticity coordinate when a white color is displaying on the screen and a gamma value of the screen.

In another example, the target optical parameters include a first chromaticity coordinate and a first luminance value when a red color is displaying on the screen, a second chromaticity coordinate and a second luminance value when a blue color is displaying on the screen, a third chromaticity coordinate and a third luminance value when a green color is displaying on the screen and a gamma value of the screen.

According to an aspect, the target optical parameters are initial target optical parameters obtained from a plurality of registers, wherein each of the plurality of registers is configured in a screen driver.

In an example, the target optical parameters are obtained by compensating initial target optical parameters obtained from a plurality of registers based on preset compensation parameters, wherein the preset compensation parameters are configured to compensate deviations of the target optical parameters introduced by assembling the screen into an electronic device.

According to an aspect, a gamma value of the screen in the target optical parameters is preset and other parameters in the target optical parameters are obtained by detecting certain colors displaying on the screen through detection components.

According to another aspect, when obtaining the initial target optical parameters, the method includes reading data stored in the plurality of registers; and restoring the read data to the initial target optical parameters based on a preset strategy, wherein the preset strategy is configured to restore the data stored in the plurality of registers to the initial target optical parameters, the data corresponding to data that is split from the initial target optical parameters to store in a signal register, when a digit number of the initial target optical parameters is greater than a digit number stored in the signal register.

According to yet another aspect, when storing the initial target optical parameters in the plurality of registers, the method includes: when a decimal part of an x value or a y value in the chromaticity coordinate in the initial target optical parameters has three or four digits and the register is an 8 bit register, splitting the decimal part of the x value or the y value into two 2-digit numbers, and storing the split data in two adjacent registers, wherein the preset strategy comprises combining the split data stored in the two adjacent registers into the x value or the y value of the chromaticity coordinate based on an order of register addresses and an order of parameters in the target optical parameters; when a decimal part of an x value or a y value in the chromaticity coordinate in the initial target optical parameters after half adjusting has N digits, and the register is an 8 bit register, comparing data of the x value or the y value after half adjusting with a corresponding standard coordinate value and storing a difference therebetween in the register, in which a decimal part of the standard coordinate value has N−1 digits, wherein the preset strategy comprises restoring the data stored in the register into the x value or the y value of the chromaticity coordinate based on an order of the register address, an order of parameters in the target optical parameters, and standard coordinate values; and when the luminance value in the initial target optical parameters is a 3-digit number and the register is an 8 bit register, splitting the luminance value into two 2-digit numbers, and storing the split data in two adjacent registers, wherein the preset strategy comprises combining the split data stored in the two adjacent registers based on an order of the register addresses and an order of parameters in the target optical parameters, so as to restore the luminance value.

In an example, when calculating the target set of R, G, B components of the target white point based on the target optical parameters, the method includes calculating a transformation matrix from tristimulus values to R, G, B components based on the target optical parameters; transforming chromaticity coordinates of the target white point to tristimulus values of the target white point; and obtaining the target set of R, G, B components of the target white point based on a product of the tristimulus values of the target white point and the transformation matrix.

According to an aspect, when comparing the target set of R, G, B components of the target white point with the current set of R, G, B components of the current white point of the screen, and obtaining adjustment data for the current set of R, G, B components, respectively, the method includes: when a maximum component of the target set of R, G, B components is greater than 255, dividing the target set of R, G, B components by the maximum component to obtain the adjustment data for the current set of R, G, B components; and when the maximum component of the target set of R, G, B components is less than or equal to 255, dividing the target set of R, G, B components by 255 to obtain the adjustment data for the current set of R, G, B components.

Aspects of the disclosure also provide an electrical device including a processor and a memory for storing instructions executable by the processor. The processor is configured to obtain target optical parameters for representing a color space of a screen; calculate a target set of R, G, B components of a target white point based on the target optical parameters; compare the target set of R, G, B components with a current set of R, G, B components of a current white point of the screen; obtain adjustment data for the current set of R, G, B components, respectively, based on the comparison; and adjust the current set of R, G, B components of the screen based on the adjustment data for the current set of R, G, B components when the screen is displaying.

Aspects of the disclosure also provide a non-transitory computer-readable storage medium having stored therein instructions that, when executed by a processor of a terminal, causes the terminal to perform a method for adjusting screen color. The method includes obtaining target optical parameters for representing a color space of a screen; calculating a target set of R, G, B components of a target white point based on the target optical parameters; comparing the target set of R, G, B components with a current set of R, G, B components of a current white point of the screen; obtaining adjustment data for the current set of R, G, B components, respectively, based on the comparison; and when the screen is displaying, adjusting the current set of R, G, B components of the screen based on the adjustment data for the current set of R, G, B components.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

Figure 1:
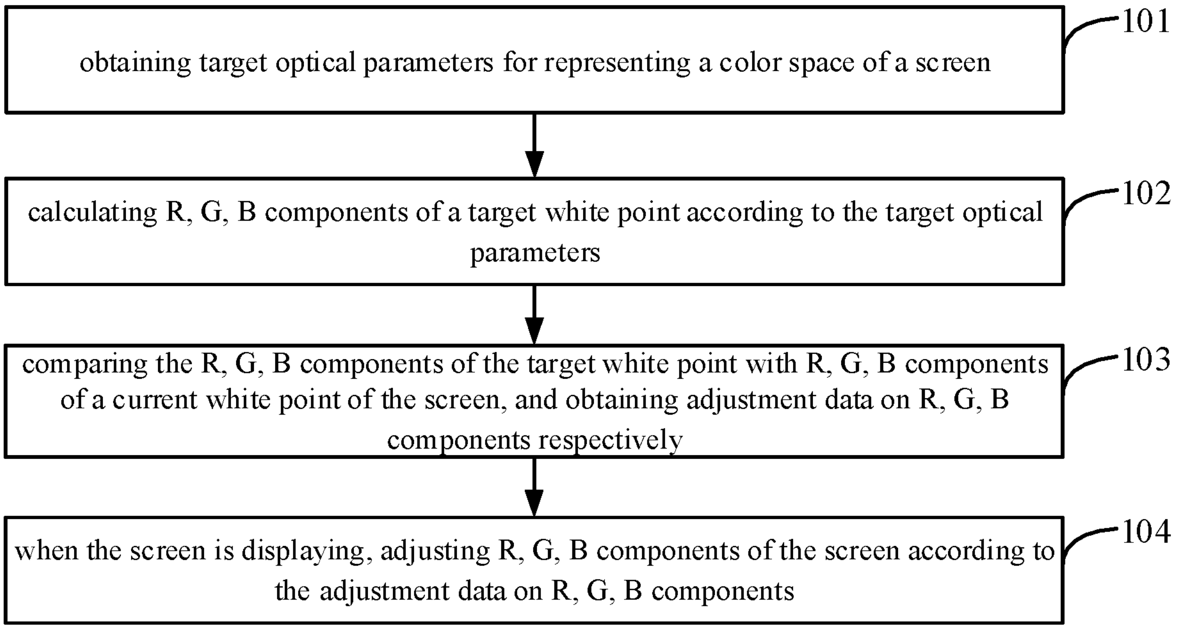
FIG. 1 is a flow chart of a method for adjusting screen color according to an example aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

Terms used herein in the description of the present disclosure are only for the purpose of describing specific aspects, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be understood that, although terms such as "first," "second" and "third" are used herein for describing various information, these information should not be limited by these terms. These terms are only used for distinguishing information of the same type. For example, first information may also be called second information, and similarly, the second information may also be called the first information, without departing from the scope of the present disclosure. As used herein, the term "if" may be construed to mean "when" or "upon" or "in response to determining" depending on the context.

Screens have been provided in more and more electronic devices. The electronic device may be a device with a display screen, such as a smart phone, a panel computer, a personal digital assistant (PDA), an E-reader, or a multimedia player, etc. To improve accuracy of displaying colors in the screen, when the screen is assembled into an electronic device with other components, color calibration may be performed on the screen.

In the related art, the "target white point" refers to the white point that a test personnel expects the screen to reach. The target white point can be reached in the screen by adjusting a chromaticity coordinate of a white color in a color space of the screen. When the screen reaches the target white point, the accuracy of displaying colors in the screen is relatively higher. Therefore, a voltage parameter corresponding to a gamma value when the screen reaches the target white point may be burned to a screen driver IC. The electronic device may invoke the voltage parameter and adjust the voltage according to the voltage parameter so as to adjust the white point in the color space of the screen to the target white point, thus realizing adjustment of the screen color.

However, since the target white point that the screen expects to reach varies with the user because the user varies with preference or the target white point that the screen expects to reach varies with certain conditions, and an amount of data that can be burned to the screen driver IC is limited, and the burned data is fixed, i.e. the target white point is fixed, the target white point cannot be adjusted flexibly.

In view of this, a method for adjusting screen color is provided according to aspects of the present disclosure to smooth defects that the target white point cannot be adjusted flexibly. In the aspects of the present disclosure, target optical parameters for representing a color space of a screen are obtained. R, G, B components of a target white point are calculated according to the target optical parameters. The R, G, B components of the target white point are compared with R, G, B components of a current white point of the screen and adjustment data on R, G, B components are obtained respectively. When the screen is displaying, R, G, B components of the screen are adjusted according to the adjustment data on R, G, B components. The target white point may be a relatively accurate one set by the test personnel or one preferred by the user.

Therefore, by calculating the R, G, B components for reaching to the target white point according to the target optical parameters and adjusting the R, G, B components of the screen respectively according to the determined adjustment data on R, G, B components when the screen is displaying, not only the screen color may be calibrated but also the white point of the screen may reach to the target white point required by the user. Other colors of the screen may get closer to corresponding colors in the color space as well. Therefore the target white point may be adjusted flexibly.

Solutions provided in the present disclosure will now be illustrated in detail as follows.

As illustrated in FIG. 1, FIG. 1 is a flow chart of a method for adjusting screen color according to an example aspect of the present disclosure. The method may be applied to an electronic device, and include following acts.

At block 101, target optical parameters for representing a color space of a screen are obtained.

At block 102, R, G, B components of a target white point are calculated according to the target optical parameters.

At block 103, the R, G, B components of the target white point are compared with R, G, B components of a current white point of the screen, and adjustment data on R, G, B components are obtained respectively.

At block 104, when the screen is displaying, R, B components of the screen are adjusted according to the adjustment data on R, G, B components.

With the aspects of the present disclosure, there are a ratio determining stage and a color adjusting stage. The ratio determining stage is configured to determine ratios multiplied by RGB channels to make the screen to reach the target white point, i.e. the adjustment data on R, G, B components. The adjustment data on R, G, B components may vary with the target white point. The color adjusting stage is configured to adjust the R, G, B components of the screen of the electronic device according to the determined adjustment data on R, G, B components, so as to make the white point of the screen to reach to the target white point. It should be noted that the present disclosure aims to adjust the white point of the screen to, or closer to, the target white point, i.e. to make a chromaticity coordinate of the white point equal to or close to a chromaticity coordinate of the target white point in the color space of the screen, and to make chromaticity coordinates of other colors equal to or close to chromaticity coordinates of their corresponding colors in the color space as well.

In this aspect, the ratio determining stage may include blocks 101 to 103 for determining the adjustment data, and the color adjusting stage may include block 104 for adjusting the screen color. Since the adjustment data on R, G, B components varies with the target white point, when the screen is displaying, the R, G, B components of the screen may be adjusted according to the adjustment data on R, G, B components corresponding to the target white point respectively. In an example, the adjustment data on R, G, B components corresponding to different target white points may be calculated at block 101 to 103 in advance. Then in the color adjusting stage, the adjustment data on R, G, B components corresponding to a certain target white point may be selected and the selected adjustment data may be used for adjusting the R, G, B components of the screen.

Since a processor usually has a relatively larger storage space, the adjustment data on R, G, B components corresponding to a plurality of target white points can be stored.

In another aspect, according to an input chromaticity coordinate of a target white point, the adjustment data on R, G, B components corresponding to the target white point may be calculated in real time, and when the screen is displaying, the R, G, B components of the screen are adjusted according to the adjustment data on R, G, B components.

For example, when the adjustment data on R, G, B components corresponding to the target white point is obtained at blocks 101 to 103, if the target white point is not changed, the R, G, B components of the screen may be adjusted according to the determined adjustment data on R, G, B components when the screen is displaying; if the target white point is changed, the adjustment data on R, G, B components corresponding to a new target white point is re-calculated at blocks 101 to 103, and the R, G, B components of the screen may be adjusted according to the re-calculated adjustment data on R, G, B components when the screen is displaying.

Now, the ratio determining stage (i.e. the stage of determining the adjustment data) will be illustrated as follows.

The target optical parameters are optical parameters configured for representing the color space of the screen. Chromaticity coordinates corresponding to different colors of the screen may be obtained according to the target optical parameters, and configured for determining the R, G, B components of the target white point together with the chromaticity coordinate of the target white point. A type of the target optical parameters may be determined according to an algorithm for calculating the R, G, B components of the target white point, and the target optical parameters may be parameters used in the algorithm. In detail, the target white point may be a relatively accurate one set by the test personnel or one preferred by the user.

In an alternative aspect, since most saturated colors of display colors may be determined by chromaticity coordinates and luminance values of R(255,0,0), G(0,255,0), and B(0,0,255), and a position of a middle color may be determined by a screen gamma curve, the chromaticity coordinates of different colors of a certain screen may be determined when the chromaticity coordinate and the luminance value of R, the chromaticity coordinate and the luminance value of G, the chromaticity coordinate and the luminance value of B and the gamma value of the screen are detected.

Based on this, the target optical parameters may include the chromaticity coordinate and the luminance value when the red color is displaying on the screen, the chromaticity coordinate and the luminance value when the blue color is displaying on the screen, the chromaticity coordinate and the luminance value when the green color is displaying on the screen and the gamma value of the screen.

It is thus clear that the chromaticity coordinate and the luminance value of R, the chromaticity coordinate and the luminance value of G, the chromaticity coordinate and the luminance value of B and the gamma value of the screen can completely represent the color space that the screen can present. By transforming the target optical parameters, other parameters such as chromaticity and saturation can be derived. Therefore the R, G, B components of the target white point can be calculated based on the above target optical parameters. In another alternative aspect, since the most saturated colors of the display colors may also be determined by chromaticity coordinates of R(255,0,0), G(0, 255,0), B(0,0,255) and W(255,255,255), and a position of the middle color may be determined by the screen gamma curve, the chromaticity coordinates of different colors of a certain screen may be determined when the chromaticity coordinates of R,G,B,W and the gamma value of the screen are detected.

Based on that, the target optical parameters may include the chromaticity coordinate when the red color is displaying on the screen, the chromaticity coordinate when the blue color is displaying on the screen, the chromaticity coordinate when the green color is displaying on the screen, the chromaticity coordinate when the white color is displaying on the screen and the gamma value of the screen.

It should be noticed that, when the color space of the screen is represented by the chromaticity coordinates of R, G, B, W and the gamma value, it is more easier to calculate the R, G, B components of the target white point based on the target optical parameters.

It should be understood that the target optical parameters may also include optical parameters collected when other colors are displaying on the screen, which are not elaborated here. The target optical parameters may also be other optical parameters as long as these optical parameters can represent the color space of the screen and be used for calculating the R, G, B components of the target white point.

In an alternative aspect, to avoid too much variation in the luminance when RGB components are adjusted, the obtained target optical parameters may further include luminance values of R, G, B, W. In detail, the target optical parameters includes the chromaticity coordinate and the luminance value when the red color is displaying on the screen, the chromaticity coordinate and the luminance value when the blue color is displaying on the screen, the chromaticity coordinate and the luminance value when the green color is displaying on the screen, the chromaticity coordinate and the luminance value when the white color is displaying on the screen, and the gamma value of the screen.

When determining the adjustment data on R, G, B components, the R, G, B components of the target white point and the R, G, B components of the current white point of the screen are compared with each other to determine initial adjustment data on R, G, B components respectively. When the red/green/blue/white color is displaying on the screen, the R, G, B components of the screen may be adjusted according to the determined initial adjustment data on R, G, B components respectively, and corresponding luminance values are detected as well. The detected luminance values are compared with the obtained luminance values. When the difference therebetween is bigger than a threshold, the adjustment data on R, G, B components are further adjusted to make the luminance difference equal to or less than the threshold, so as to obtain final adjustment data on R, G, B components. With this aspect, influence of RGB adjustment on luminance is considered and balance between the accuracy of achieving the target white point and luminance can be ensured, thus avoiding too much variation in the luminance when RGB components are adjusted.

Several ways of determining the target optical parameters will be illustrated below.

With respect to the way of determining the gamma value, when the target optical parameters includes the gamma value of the screen, in an aspect, the gamma value of the screen may be burned to a register configured in the screen driver by the manufacturer because the gamma value of the screen is determined when the screen is produced, so that when the screen is assembled into an electronic device, a processor of the device may obtain the gamma value from the register. In another aspect, the gamma value of the screen may be specified in an algorithm by the manufacturer that assembles the electronic device, i.e. the gamma value is pre-stored in the processor of the electronic device. When the electronic device is assembled, a screen with its gamma value in accordance with the specified gamma value may be selected so as to avoid storage space of the register of the screen driver being occupied by the gamma value.

With respect to ways of determining other target optical parameters, in an alternative aspect, the initial target optical parameters obtained from the registers may be used as the target optical parameters, and each register is configured in the screen driver.

In this aspect, the initial target optical parameters may be burned in the registers configured in the screen driver of the electronic device and may be accessed by an AP (application processor) of the electronic device in the ratio determining stage and the color adjusting stage.

In detail, before a screen module leaves a factory, an optical test under a certain optical test condition may be performed by the manufacturer, the initial target optical parameters which can represent the color space of the screen is detected in the test and burned to the registers configured in the screen driver. For example, before the screen module leaves the factory, initial target optical parameters of a picture which can represent features of the screen may be detected, and the picture which can represent the features of the screen may be determined by the algorithm used for calculating the R, G, B components of the target white point. When the algorithm requires the optical tests of some pictures, the initial target optical parameters of these pictures are burned to the registers. For example, when the target optical parameters of a red picture, a blue picture and a green picture are needed in the algorithm, the target optical parameters of these three pictures are burned. When the optical test is performed, the screen may be turned on and a picture of a corresponding color is displayed. Then the target optical parameters may be measured by optical instruments, for example, the chromaticity coordinate and the luminance value of each picture may be measured.

When the initial target optical parameters are burned in the registers of the screen driver, the manufacturer of the electronic device may assemble the screen with other assemblies to obtain the electronic device. In the ratio determining stage, the initial target optical parameters may be read from the registers by the processor of the electronic device and be determined as the target optical parameters directly.

Therefore, with this aspect, no matter different screens belong to a same item or not, each screen has its initial target optical parameters burned therein and the target optical parameters of each screen itself may be obtained in the following ratio determining stage. Therefore, inaccuracy of the target optical parameters caused when unique initial target optical parameters are applied to different screens and corresponding inaccurate of the ratio determination may be avoided. In detail, the same item may refer to the same kind of mobile phones or the same kind of panel computers, etc.

In another alternative aspect, the target optical parameters may be obtained by compensating the initial target optical parameters obtained from the registers based on preset compensation parameters. The preset compensation parameters may be configured to compensate a deviation of the target optical parameters introduced by assembling of the electronic device.

The initial target optical parameters may be burned to the registers configured in the screen driver by means described above, which will not be elaborated here. Because the initial target optical parameters burned in the registers of the screen driver may be test in a screen-factory state, when the screen is installed into the electronic device, due to sticking of cover glass and slightly structure change, the actual target optical parameters may be different from the initial target optical parameters. In consideration of this circumstance, to avoid deviations of the target optical parameters caused when assembling the electronic device, the target optical parameters of the assembled electronic device may be test by an accurate optical detection device under the same test condition as which before the assembling. The test target optical parameters may be then compared with the target optical parameters obtained from the registers to obtain the preset compensation parameters, so as to use the compensation parameters for compensating the deviations of the target optical parameters caused by assembling the electronic device.

When the gamma value of the screen is burned in the register configured in the screen driver, in an aspect, since the gamma value is not affected too much by assembling and the gamma value is difficult to measure, no compensation is made to the gamma value, or a preset compensation parameter corresponding to the gamma value may be set to 0, thus reducing time consumption for determining the preset compensation parameters.

Thus by obtaining the target optical parameters through compensating the initial target optical parameters based on the preset compensation parameters, optical deviations caused by assembling may be avoided, accuracy of the target optical parameters may be improved and therefore accuracy of color adjusting in following acts may be improved as well.

In another alternative aspect, the gamma value of the screen in the target optical parameters is preset and other parameters in the target optical parameters are obtained by detecting certain colors displaying on the screen through detection components.

After the electronic device is assembled, if the gamma value of the screen is included in the target optical parameters, the gamma value of the screen may be pre-stored in the electronic device. For other parameters in the target optical parameters, they may be obtained by detecting the target optical parameters through the detection components when certain colors are displaying on the screen under certain conditions. Taking the other parameters in the target optical parameters including the chromaticity coordinate when the red color is displaying on the screen, the chromaticity coordinate when the blue color is displaying on the screen, the chromaticity coordinate when the green color is displaying on the screen and the chromaticity coordinate when the white color is displaying on the screen as an example, the chromaticity coordinate when the red color is displaying on the screen, the chromaticity coordinate when the blue color is displaying on the screen, the chromaticity coordinate when the green color is displaying on the screen and the chromaticity coordinate when the white color is displaying on the screen may be detected by the detection device so as to obtain the corresponding target optical parameters.

With this aspect, by obtaining the target optical parameters through direct storage and test, optical deviations caused by assembling is avoided, accuracy of the target optical parameters may be improved and therefore accuracy of color adjusting in following acts may be improved as well.

It should be understood that the target optical parameters may also be obtained by other ways. For example, all the parameters in the target optical parameters are obtained based on detecting the screen by the detection components when certain colors are displaying on the screen. Examples of the other ways will not be elaborated one by one.

When the target optical parameters are burned in the registers configured in the screen driver of the electronic device, in an alternative aspect, when the digit number corresponding to each parameter in the target optical parameters is less than or equal to the digit number stored in one register, each register may store at least one parameter in the initial target optical parameters. An order of storing the initial target optical parameters is provided to the processor of the electronic device so that the processor may restore the initial target optical parameters according to the order.

It is assumed that the chromaticity coordinates and the luminance values of the screen test in the screen-factory state when the red, green and blue colors are displaying on the screen are as table 1.

TABLE 1

| | x | y | luminance value |
|---|---|---|---|
| R | 0.6812 | 0.3242 | 124 |
| G | 0.267 | 0.6885 | 403 |
| B | 0.1477 | 0.0662 | 59 |

Here, the x value and the y value in the chromaticity coordinate both have four digits, and the luminance value is a 3-digit number. Therefore a 16 bit register may be used to record each parameter of the target optical parameters, and three 16 bit registers may be needed for storing parameters corresponding to each color. In detail, since integer parts of the x value and the y value are zero, only the decimal parts need to be stored, and the numerical value may be restored when the x value and the y value are read. For example, assuming that the x and y values and luminance values of R, G, B are stored in turn in the registers beginning from address A1, the corresponding relationship between an address and a hexadecimal value of each parameter is illustrated in table 2. The hexadecimal value of each parameter is stored in the register with the corresponding address, and decimal values of the parameters are also provided for reference.

TABLE 2

| address | value (hexadecimal) | value (decimal) |
|---|---|---|
| A1 | 1A9C | 6812 |
| A2 | CAA | 3242 |
| A3 | 7C | 124 |
| A4 | A6E | 2670 |
| A5 | 1AE5 | 6885 |
| A6 | 193 | 403 |
| A7 | 5C5 | 1477 |
| A8 | 296 | 662 |
| A9 | 3B | 59 |

Based on that, obtaining the initial target optical parameters may include reading data recorded in a plurality of registers configured in the screen driver and restoring the corresponding initial target optical parameters by its parameter storage order. For example, 1A9C and CAA are restored to the chromaticity coordinate (0.6812, 0.3242) of the red color and 7C is restored to the luminance value 124 of the red color.

In another alternative aspect, since the register in the screen driver is usually 8 bit register, the 3-digit number or the 4-digit number cannot be stored in one register. Therefore, it may occur such a circumstance that the digit number corresponding to each parameter in the target optical parameters is greater than the digit number stored in one register. In consideration of this circumstance, each parameter in the initial target optical parameters may be split into data that can be stored in one register, so that each parameter in the initial target optical parameters can be stored by a plurality of registers. A storage strategy of the initial target optical parameters is provided to the processor, so that the initial target optical parameters may be restored by the processor according to a preset strategy corresponding to the storage strategy. The storage strategy may include splitting each of the target optical parameters into data that can be stored by one register when the digit number of each of the target optical parameters is greater than the digit number stored by one register, and storing the split data in the corresponding number of registers.

Two kinds of strategies will now be illustrated as examples.

In one example, since the integer parts of the chromaticity coordinates are usually zero, the decimal part of the x value or the y value in the chromaticity coordinate is split into data that can be stored by one register, and the split data are stored in the corresponding number of registers with the adjacent addresses.

For example, when the decimal part of the x value or the y value in the chromaticity coordinate in the initial optical parameter has three or four digits and the register is an 8 bit register, the decimal part of the x value or the y value may be split into two 2-digit numbers, and the split data are stored in two adjacent registers.

Thus, by recording the decimal part of the x value or the y value with 3 or 4 digits in two 8 bit registers, the chromaticity coordinate may be stored even if the digit number of each of the chromaticity coordinate is greater than the digit number stored by a single register.

In another example, since the luminance value is usually an integer, the luminance value in the initial optical parameters may be split into data that can be stored by one register, and the split data are stored in the corresponding number of registers with the adjacent addresses.

When the luminance value in the initial optical parameter is a 3-digit number and the register is an 8 bit register, the luminance value may be split into two 2-digit numbers, and the split data are stored in two adjacent registers.

Thus, by recording the 3-digit luminance value in two 8 bit registers, the luminance value may be stored even if the digit number of the luminance value is greater than the digit number stored by a single register.

It should be understood that besides the above strategies, there may also be other strategies, which won't be elaborated one by one.

It is assumed that the chromaticity coordinates and the luminance values test in the screen-factory state when the red, green, blue and white colors are displaying on the screen are as follows.

TABLE 3

| | x | y | luminance value |
|---|---|---|---|
| R | 0.6812 | 0.3242 | 124 |
| G | 0.267 | 0.6885 | 403 |
| B | 0.1477 | 0.0662 | 59 |
| W | 0.2955 | 0.3162 | 586 |

Here, the x value and the y value in the chromaticity coordinate both have four digits, and the luminance value is a 3-digit number. Therefore two 8 bit registers may be used to record each parameter of the target optical parameters, and six 8 bit registers may be needed for storing parameters corresponding to each color. In detail, since the integer parts of the x value and the y value are zero, the decimal parts may be stored in two 8 bit registers, and the numerical value may be restored when the x value and the y value are read. For example, assuming that the x and y values and the luminance values of R, B, W are stored in turn in the registers beginning from address A1, the corresponding relationship between an address and a hexadecimal value of each parameter is illustrated in table 4. The hexadecimal value of each parameter is stored in the register with the corresponding address, and the decimal values of the parameters are also provided for reference.

TABLE 4

| address | value (hexadecimal) | value (decimal) |
|---|---|---|
| A1 | 44 | 68 |
| A2 | C | 12 |
| A3 | 20 | 32 |
| A4 | 2A | 42 |
| A5 | 1 | 1 |
| A6 | 18 | 24 |
| A7 | 1A | 26 |
| A8 | 46 | 70 |
| A9 | 44 | 68 |
| AA | 55 | 85 |
| AB | 4 | 4 |
| AC | 3 | 3 |
| AD | E | 14 |
| AE | 4D | 77 |
| AF | 6 | 6 |
| B1 | 3E | 62 |
| B2 | 0 | 0 |
| B3 | 3B | 59 |
| B4 | E5 | 229 |
| B5 | 37 | 55 |
| B6 | 1F | 31 |
| B7 | 3E | 62 |
| B8 | 5 | 5 |
| B9 | 56 | 86 |

Based on that, obtaining the initial target optical parameters may include reading data stored in the plurality of registers configured in the screen driver and restoring the read data to the initial target optical parameters according to the preset strategy. In detail, the preset strategy is a strategy which may restore the data stored the plurality of registers to the initial target optical parameters. The data refer to one which is split from the initial target optical parameters to store in a signal register, when the digit number of the initial target optical parameters is greater than the digit number stored in one register.

In an aspect, the preset strategy corresponds to the storage strategy, which may restore the data stored in the plurality of registers to the initial target optical parameters.

With this aspect, the data stored the plurality of registers may be restored to the initial target optical parameters according to the preset strategy, so as to achieve restoring of the initial target optical parameters. The initial target optical parameters may be stored even if the digit number of each parameter in the initial target optical parameters is greater than the digit number stored by a single register.

In an aspect, the preset strategy includes combining split data stored in two adjacent registers according to an order of the register addresses and an order of parameters in the target optical parameters, so as to restore the x value or the y value of the chromaticity coordinate.

In an aspect, the preset strategy includes combining split data stored in two adjacent registers according to an order of the register addresses and an order of parameters in the target optical parameters, so as to restore the luminance value.

Taking table 4 for an example, the register addresses in table 4 are from A1 to AF and from B1 to B9. The order of the parameters in the target optical parameters may be the x, y value and the luminance value of R, the x, y value and the luminance value of G, the x, y value and the luminance value of B, and the x, y value and the luminance value of W. Based on that, data “44” and “C” at A1 and A2 may be combined to generate the x value 0.6812 of R in the chromaticity coordinate; data “20” and “21” at A3 and A4 may be combined to generate they value 0.3242 of R in the chromaticity coordinate; data “1” and “18” at A5 and A6 may be combined to generate the luminance value, and so on.

Furthermore, when a decimal part of the x value or the y value in the chromaticity coordinate in the initial target optical parameters after half adjusting has N digits, and the register is an 8 bit register, data of the x value or the y value after half adjusting may be compared with a corresponding standard coordinate value and a difference therebetween may be stored in the register. The decimal part of the standard coordinate value may has M digits, M<N. The preset strategy includes restoring the date stored in the register into the x value or the y value of the chromaticity coordinate according to the order of the register address, the order of parameters in the target optical parameters, and standard coordinate values.

In detail, M and N are integers. In an aspect, M=N−1. The x values and the y values of different chromaticity coordinates may have their own corresponding standard coordinate values. For example, it is set standard coordinate values corresponding to the x value and the y value of R, standard coordinate values corresponding to the x value and the y value of G, and standard coordinate values corresponding to the x value and the y value of B, etc.

In practice, luminance change is usually relatively greater. The RGB chromaticity coordinates may generally vary in a range of ±0.0300. Due to device accuracy, the last digit is not quite accurate, thus a half adjustment may be performed and three digits are remained, i.e. N=3. Thereby a 16 bit register may be used to store the luminance value, and an 8 bit register may be used to store the difference between each coordinate in the RGB chromaticity coordinates and its corresponding standard coordinate value, thus decreasing the number of registers needed for storage.

As illustrated in table 3, for the chromaticity coordinate of R, the x value is 0.6812, the y value is 0.3242, and an standard coordinate corresponding to the chromaticity coordinate of R is defined as (0.68, 0.32). It can be seen that the standard coordinate value corresponding to the x value of R is 0.68, and the standard coordinate value corresponding to the y value of R is 0.32. When the last digit of the chromaticity coordinate of R is half adjusted, x' becomes to 0.681, y' becomes to 0.324. The half adjusted data x' is then compared with the corresponding standard coordinate value of x, and the difference therebetween is obtained as 0.001. The half adjusted data y' is then compared with the corresponding standard coordinate value of y, and the difference therebetween is obtained as 0.004. Therefore the difference corresponding to the x value of R may be stored in one 8 bit register and the difference corresponding to the y value of R may be stored in one 8 bit register. Therefore, the number of registers may be reduced.

In a stage of obtaining the initial target optical parameters, register(s) corresponding to each parameter of the initial target optical parameters may be determined according to the order of the register address and the order of the initial target optical parameters. When the initial target optical parameters includes the chromaticity coordinates, the data stored in the register(s) corresponding to the chromaticity coordinates are restored to difference values and added together with corresponding standard coordinate values to obtain corresponding chromaticity coordinates. For example, assuming data “1” and “4” are stored in the registers corresponding to the chromaticity coordinate of R, the data are restored to difference values 0.001 and 0.004, and then 0.001 is added together with a corresponding standard coordinate value 0.68 to obtain 0.681, and 0.004 is added together with a corresponding standard coordinate value 0.32 to obtain 0.324, such that the chromaticity coordinate of R may be restored to (0.681, 0.324).

When the target optical parameters for representing the color space of the screen is obtained, the R, G, B components of the target white point may be calculated according to the target optical parameters. As one of the possible ways, calculating the R, G, B components of the target white point according to the target optical parameters may include following acts.

A transformation matrix from tristimulus values to R, G, B components is calculated according to the target optical parameters.

Chromaticity coordinates of the target white point are transformed to tristimulus values of the target white point.

The R, G, B components of the target white point are obtained based on a product of the tristimulus values and the transformation matrix.

In detail, since the target optical parameters are configured for representing the color space of the screen, once the color space and the gamma value are determined, a one-to-one correspondence relationship may be established between tristimulus values X, Y, Z and R, G, B components. For each group of R, G, B components, a corresponding group of X, Y, Z may be determined based on the correspondence relationship, conversely, for each group of X, Y, Z, a corresponding group of R, G, B components may be determined based on the correspondence relationship as well. The correspondence relationship may be described by a 3*3 matrix.

During a process of obtaining the transformation matrix, the chromaticity coordinates in the target optical parameters are transformed to the tristimulus values, for example, the chromaticity coordinates in the target optical parameters may be transformed to the tristimulus values via formulas of $$X = \frac{Y}{y}x, \text{ and}$$

$$Z = \frac{Y}{y}(1 - x - y)$$

where, X, Y, Z represent the tristimulus values, and (x, y) represents the chromaticity coordinate.

Furthermore, when dealing with the white point, a maximum luminance is usually required, and in the tristimulus values, Y represents both the chromaticity and the luminance, X and Z represent the chromaticity, so that Y may be normalized, for example denoting Y=1, to reduce computational complexity and increase computational efficiency.

When the tristimulus values are obtained, since the tristimulus values X, Y, Z and the R, G, B components of the screen have a one-to-one correspondence relationship, the transformation matrix from tristimulus values to R, G, B components corresponding to the screen may be obtained. Other methods for obtaining the transformation matrix in the related art may also be used, and there are no limits on that.

Because the target white point is a white point which the test personnel or the user wants the screen to reach, the chromaticity coordinate of the target white point may be already known. The chromaticity coordinate of the target white point may be transformed to the tristimulus values of the target white point. Since the transformation matrix from tristimulus values to R, G, B components is determined, the R, G, B components of the target white point may be obtained based on a product of the tristimulus values of the target white point and the transformation matrix. In an aspect, the tristimulus values of the target white point are multiplied by the transformation matrix to obtain a product, and then a power operation is performed based on the product and the gamma value, so as to obtain the R, G, B components of the target white point.

For example, for an LCD, transformation from XYZ to RGB of the screen may be achieved with a 3*3 transformation matrix. Once the chromaticity coordinates and the luminance values of a red, a green and a blue picture are obtained, XYZ values of the red, green and blue pictures may be determined respectively. Since the RGB value of the red color is [255 0 0], the RGB value of the green color is [0 255 0], and the RGB value of the blue color is [0 0 255], a gamma transformation may be performed to the RGB values to obtain R', G', B', in which Gamma=2.2, $R'=(R/255)^{2.2}$, $G'=(G/255)^{2.2}$, $B'=(B/255)^{2.2}$. There are 9 unknown numbers in a 3*3 matrix, once three groups of RGB parameters are brought into the following formula of $$\begin{bmatrix} R' \\ G' \\ B' \end{bmatrix} = \begin{bmatrix} XYZ \to R'G'B' \\ 3 \times 3 \\ \text{matrix} \end{bmatrix} \cdot \begin{bmatrix} X \\ Y \\ Z \end{bmatrix}$$

9 equations may be developed, and thereby obtaining the 9 unknown numbers in the matrix and then obtaining the 3*3 transformation matrix.

When the transformation matrix is obtained, in an actual calculation process, assuming that R, G, B represent the R, G, B components of the target white point, and X, Y, Z represent the tristimulus values of the target white point, the tristimulus values (X, Y, Z) of the target white point may be multiplied by the transformation matrix to obtain R', G', B'. The power operation may also be performed to obtain the R, G, B components of the target white point as $R=255*R'^{(1/2.2)}$, $G=255*G'^{(1/2.2)}$, $B=255*B'^{(1/2.2)}$.

When the R, B components of the target white point are determined, the R, G, B components of the target white point are compared with the R, G, B components of the current white point of the screen, and the adjustment data on R, G, B components are obtained accordingly.

In detail, adjustment data on R component is configured for adjusting an actual value of the R component to a desired value, adjustment data on G component is configured for adjusting an actual value of the G component to a desired value, and adjustment data on B component is configured for adjusting an actual value of the G component to a desired value. In an aspect, the adjustment data on R, G, B components may be adjustment ratios of the R, G, B components. The quick adjustment may be realized in a way of ratio adjustment.

In practice, since the R, B components of the current white point of the screen are usually [255, 255, 255], thus the R, G, B components of the current white point of the screen may be directly compared with 255. When a maximum component of the R, G, B components of the target white point is less than or equal to 255, the R, G, B components of the target white point are divided by 255 to obtain the adjustment data on R, G, B components. For example, adjustment data a on R component, adjustment data b on G component, and adjustment data c on B component may be determined by following formulas of $$a=R/255,$$

$$b=G/255, \text{ and}$$

$$c=B/255.$$

When the maximum component of the R, G, B components of the target white point is greater than 255, the R, G, B components of the target white point are divided by the maximum component to obtain the adjustment data on R, G, B components. For example, the adjustment data a on R component, the adjustment data b on G components, and the adjustment data c on B components may be determined by following formulas of $$a=R/\text{MAX},$$

$$b=G/\text{MAX}, \text{ and}$$

$$c=B/\text{MAX},$$

where, MAX represents the maximum component of R, G, B components.

Thus, by comparing the R, G, B components of the target white point directly with 255, the adjustment data on R, G, B components may be obtained relatively quickly.

Next, the color adjusting stage will be illustrated.

Since the adjustment data on R, B components corresponding to the target white point are already obtained, R, G, B components of the screen may be adjusted according to the obtained adjustment data on R, G, B components when different colors are displaying on the screen. For example, assuming the adjustment data are adjustment ratios, when the R, G, B components of the screen are obtained, the obtained R component is multiplied by the adjustment data on R component to obtain an adjusted R component, the obtained G component is multiplied by the adjustment data on G component to obtain an adjusted G component, and the obtained B component is multiplied by the adjustment data on B component to obtain an adjusted B component. Then the adjusted R component, the adjusted G component and the adjusted B component are displayed so as to achieve screen color adjustment.

Figure 2:
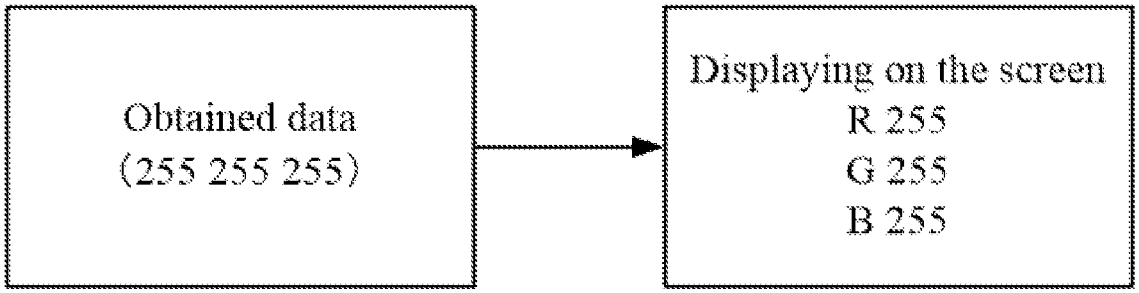
FIG. 2 is a schematic diagram illustrating displaying a pure white picture in the related art.

While in the related art, the RGB components are obtained by the device processor and displayed directly on the screen. Referring to FIG. 2, FIG. 2 is a schematic diagram illustrating displaying a pure white picture in the related art. In this diagram, the RGB values corresponding to a white picture is (255,255,255). When displaying on the screen, the white picture may be displayed as (255,255,255) directly. In this case, a coordinate of a test white point may be (0.2955, 0.3162).

Figure 3:
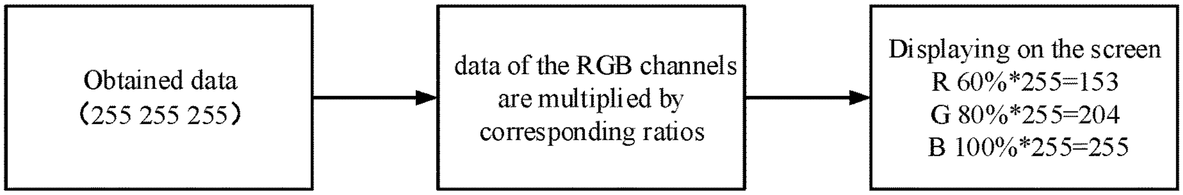
FIG. 3 is a schematic diagram illustrating displaying a pure white picture according to an example aspect of the present disclosure.

To adjust the white point of the screen to the target white point, the RGB channels may be multiplied by a ratio less than 1 by a device processor, so as to decrease displaying of one or some kinds of colors. Referring to FIG. 3, FIG. 3 is a schematic diagram illustrating displaying a pure white picture according to an example aspect of the present disclosure. In this diagram, the RGB values corresponding to the white picture is (255,255,255), and the adjusting data on R, G, B components are 60%, 80%, and 100%. Thus, when displaying on the screen, data of the RGB channels are multiplied by corresponding ratios, and the white point of the screen is adjusted to the target white point.

The technical features described in aspects of the present disclosure may be combined in any ways as long as there are no conflicts or contradictions. The combinations will not be illustrated one by one for concision, but those skilled in the art should understand that any combination of the technical features described in aspects should fall in the scope of the present disclosure.

An application example is illustrated as follows.

The luminance values and the chromaticity coordinates of R, G, B, W burned by a module factory are as follows. When installed into an electronic device, chromaticity coordinates of the screen are read out correctly by an AP (application processor).

| | x | y | LV |
|---|---|---|---|
| R | 0.6812 | 0.3242 | 124 |
| G | 0.267 | 0.6885 | 403 |
| B | 0.1477 | 0.0662 | 59 |
| W | 0.2955 | 0.3162 | 586 |

After product tests and comparisons at early stage, it is detected that a read x value of the red color is 0.0045 less than its actual value, and a ready value of the green color is 0.006 greater than its actual value. Therefore, the preset compensation parameter corresponding to the x value of the red color is set to 0.0045 and the preset compensation parameter corresponding to the y value of the green color is set to −0.006. Thus the read x value of the red color is added by 0.0045 to obtain the actual x value of the red color. The read y value of the green color is added by −0.006 to obtain the actual y value of the green color. Then the adjusted target optical parameters may be as follows.

| | x | y | LV |
|---|---|---|---|
| R | 0.6857 | 0.3242 | 124 |
| G | 0.267 | 0.6825 | 403 |
| B | 0.1477 | 0.0662 | 59 |
| W | 0.2955 | 0.3162 | 586 |

A 3*3 transforming matrix from XYZ to RGB may be obtained based on chromaticity coordinates of RGBW, which may be as follows.

| | | |
|---|---|---|
| 2.7518 | −1.0448 | −0.4291 |
| −0.8384 | 1.7735 | 0.0082 |
| 0.0511 | −0.0823 | 0.8425 |

When the chromaticity coordinate of the target white point are (0.30, 0.32), normalized values of XYZ are as follows.

| |
|---|
| 0.9375 |
| 1 |
| 1.1875 |

The calculated R, G B components of the target white point are 258, 255, 251.

Therefore a=258/258=1, b=255/258=0.9884, and c=251/258=0.9729.

When the data of the screen are processed by the AP, the R channel is multiplied by 1, the G channel is multiplied by 0.9884 and the B channel is multiplied by 0.9729 at each time, thus making the white point of the screen getting closer to the coordinate (0.32, 0.32), and other colors are getting closer to corresponding colors in the color space as well.

With this aspect, the adjustment data on R, G, B components may be obtained according to features of each screen, thus increasing the accuracy of the screen. Besides, since only color features of the screen itself are stored in the registers configured in the screen driver, and the adjustment data corresponding to the target white point are generated by algorithms executed by the device processor, a target value of the white point may be modified flexibly, thus the target white point is more controllable.

Corresponding to the method for adjusting screen color in above aspects, it is further provided an apparatus and a device for adjusting screen color, and a storage medium.

Figure 4:
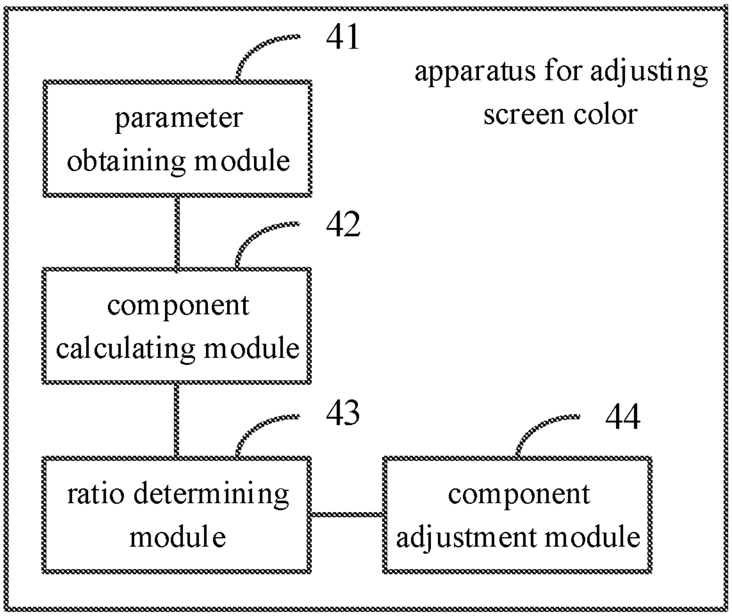
FIG. 4 is a block diagram illustrating an apparatus for adjusting screen color according to an example aspect of the present disclosure.

As illustrated in FIG. 4, FIG. 4 is a block diagram illustrating an apparatus for adjusting screen color according to an example aspect of the present disclosure. The apparatus include a parameter obtaining module 41, a component calculating module 42, a ratio determining module 43 and a component adjustment module 44.

The parameter obtaining module 41 is configured to obtain target optical parameters for representing a color space of a screen.

The component calculating module 42 is configured to calculate R, G, B components of a target white point according to the target optical parameters.

The ratio determining module 43 is configured to compare the R, G, B components of the target white point with R, G, B components of a current white point of the screen, and to obtain adjustment data on R, G, B components respectively.

The component adjustment module 44 is configured to adjust R, G, B components of the screen according to the adjustment data on R, G, B components when the screen is displaying.

With this aspect, by calculating the R, G, B components of the target white point according to the target optical parameters and adjusting the R, G, B components of the screen according to the determined adjustment data on R, G, B components when the screen is displaying and by changing the target white point, not only the screen color may be calibrated but also the white point of the screen may reach to the target white point required by the user. Other colors of the screen may get closer to corresponding colors in the color space as well. Therefore the target white point may be adjusted flexibly.

In an alternative aspect, the target optical parameters may include a chromaticity coordinate when a red color is displaying on the screen, a chromaticity coordinate when a blue color is displaying on the screen, a chromaticity coordinate when a green color is displaying on the screen, a chromaticity coordinate when a white color is displaying on the screen and a gamma value of the screen.

In an alternative aspect, the target optical parameters may include a chromaticity coordinate and a luminance value when a red color is displaying on the screen, a chromaticity coordinate and a luminance value when a blue color is displaying on the screen, a chromaticity coordinate and a luminance value when a green color is displaying on the screen and a gamma value of the screen.

It can be seen from the above aspects that with these types of target optical parameters, R, G, B components of the target white point may be quickly calculated and resource consumption caused by obtaining too much target optical parameters can be avoided.

In an alternative aspect, the target optical parameters are initial target optical parameters obtained from registers, each register is configured in a screen driver.

With this aspect, no matter different screens belong to a same item or not, each screen has its initial target optical parameters burned therein and the target optical parameters of each screen itself may be obtained in the following ratio determining stage. Therefore, inaccuracy of the target optical parameters caused when unique initial target optical parameters is applied to different screens and corresponding inaccurate of the ratio determination may be avoided.

In an alternative aspect, the target optical parameters are obtained by compensating initial target optical parameters obtained from registers based on preset compensation parameters, the preset compensation parameters are configured to compensate deviations of the target optical parameters introduced by assembling the screen into an electronic device.

With this aspect, the initial target optical parameters obtained from the register may be compensated based on the preset compensation parameters to obtain the target optical parameters, optical deviations caused by assembling may be avoided, accuracy of the target optical parameters may be improved and therefore accuracy of color adjusting in following acts may be improved as well.

In an alternative aspect, the gamma value of the screen in the target optical parameters is preset and other parameters in the target optical parameters are obtained by detecting certain colors displaying on the screen through detection components.

With this aspect, by directly storing the gamma value and other parameters in the target optical parameters after testing and assembling, optical deviations caused by assembling may be avoided, accuracy of the target optical parameters may be improved and therefore accuracy of color adjusting in following acts may be improved as well.

Figure 5:
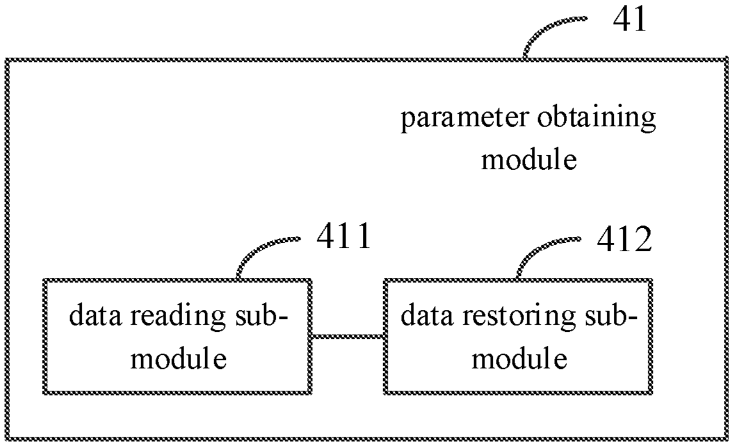
FIG. 5 is a block diagram illustrating another apparatus for adjusting screen color according to an example aspect of the present disclosure.

As illustrated in FIG. 5, FIG. 5 is a block diagram illustrating still another apparatus for adjusting screen color according to an example aspect of the present disclosure. On the basis of the aspect illustrated with reference to FIG. 4, the parameter obtaining module 41 further includes a data reading sub-module 411 and a data restoring sub-module 412.

The data reading sub-module 411 is configured to read data stored in a plurality of registers configured in the screen driver.

The data restoring sub-module 412 is configured to restore the read data to the initial target optical parameters according to a preset strategy.

In detail, the preset strategy is configured to restore the data stored in the plurality of registers to the initial target optical parameters, and the data refers to one which is split from the initial target optical parameters to store in a signal register, when the digit number of the initial target optical parameters is greater than the digit number stored in the signal register.

With this aspect, when the digit number of the initial target optical parameters is greater than the digit number stored by one register, the initial target optical parameters may be split into data that can be stored by one register. When the data stored in the registers configured in the screen driver is read out, the read data may be restored to the initial target optical parameters according to the preset strategy. Therefore it may be avoided that the initial target optical parameters cannot be stored when the digit number of the initial target optical parameters is greater than the digit number stored by a single register, and the read data can be restored to the initial target optical parameters according to the preset strategy.

Figure 6:
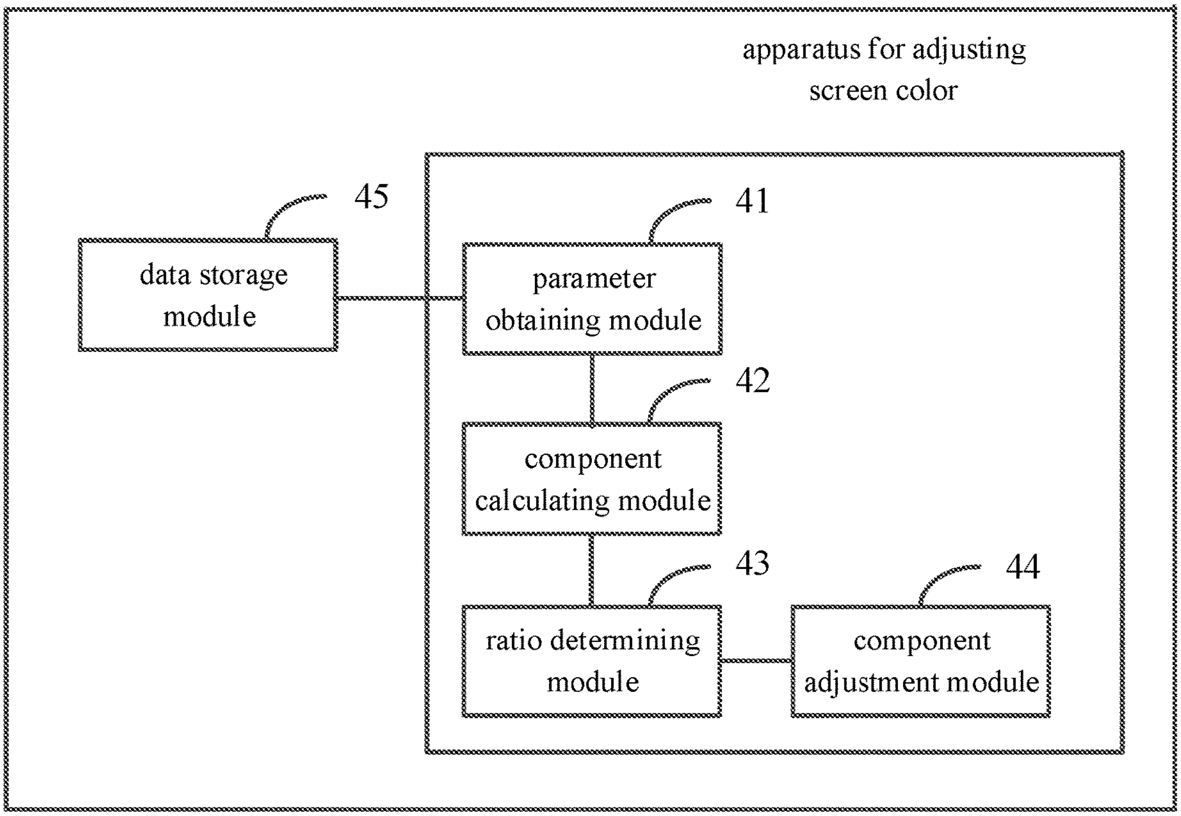
FIG. 6 is a block diagram illustrating yet another apparatus for adjusting screen color according to an example aspect of the present disclosure.

As illustrated in FIG. 6, FIG. 6 is a block diagram illustrating yet another apparatus for adjusting screen color according to an example aspect of the present disclosure. On the basis of the aspect illustrated with reference to FIG. 4, the apparatus further includes a data storage module 45. The data storage module 45 is configured to:

when a decimal part of an x value or a y value in the chromaticity coordinate in the initial target optical parameters has three or four digits and the register is an 8 bit register, split the decimal part of the x value or the y value into two 2-digit numbers, and store the split data in two adjacent registers; in which the preset strategy includes: combining the split data stored in the two adjacent registers into the x value or the y value of the chromaticity coordinate according to an order of register addresses and an order of parameters in the target optical parameters;

when a decimal part of an x value or a y value in the chromaticity coordinate in the initial target optical parameters after half adjusting has N digits, and the register is an 8 bit register, compare data of the x value or the y value after half adjusting with a corresponding standard coordinate value and store a difference therebetween in the register, in which a decimal part of the standard coordinate value has N−1 digits; in which the preset strategy includes restoring the date stored in the register into the x value or the y value of the chromaticity coordinate according to an order of the register address, an order of parameters in the target optical parameters, and standard coordinate values; and when the luminance value in the initial target optical parameters is a 3-digit number and the register is an 8 bit register, split the luminance value into two 2-digit numbers, and store the split data in two adjacent registers; in which the preset strategy includes combining the split data stored in the two adjacent registers according to an order of the register addresses and an order of parameters in the target optical parameters, so as to restore the luminance value.

In detail, the parameter obtaining module 41, the component calculating module 42, the ratio determining module 43 and the component adjustment module 44 may be configured in a processor of an electronic device, and the data storage module 45 may be configured in a screen driver of the electronic device.

Figure 7:
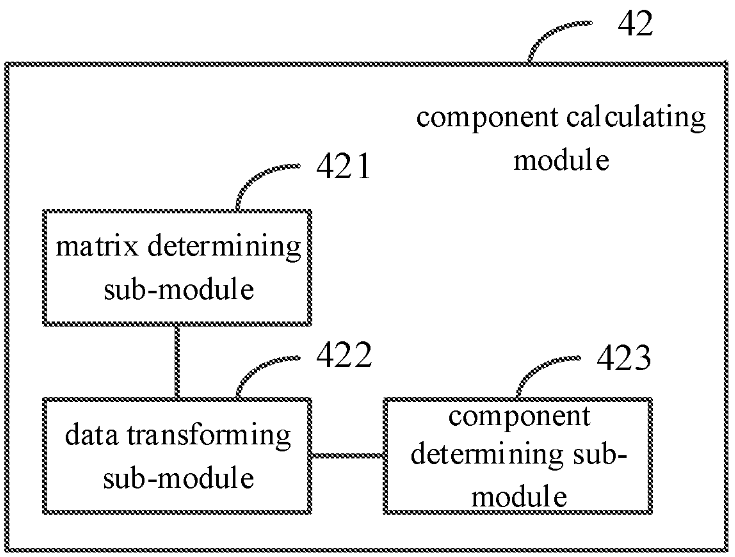
FIG. 7 is a block diagram illustrating still another apparatus for adjusting screen color according to an example aspect of the present disclosure.

As illustrated in FIG. 7, FIG. 7 is a block diagram illustrating still another apparatus for adjusting screen color according to an example aspect of the present disclosure. On the basis of the aspect illustrated with reference to FIG. 4, the component calculating module 42 further includes a matrix determining sub-module 421, a data transforming sub-module 422 and a component determining sub-module 423.

The matrix determining sub-module 421 is configured to obtain a transformation matrix from tristimulus values to R, G, B components according to the target optical parameters.

The data transforming sub-module 422 is configured to transform chromaticity coordinates of the target white point to tristimulus values of the target white point.

The component determining sub-module 423 is configured to obtain the R, B components of the target white point based on a product of the tristimulus values of the target white point and the transformation matrix.

With this aspect, the transformation matrix from the tristimulus values to the R, G, B components is obtained according to the target optical parameters, the chromaticity coordinates of the target white point are transformed to the tristimulus values of the target white point, and then the R, G, B components of the target white point is obtained based on the product of the tristimulus values of the target white point and the transformation matrix, thus the R, G, B components of the target white point may be obtained relatively quickly.

In an alternative aspect, the ratio determining module 43 may be configured to perform following acts.

When a maximum component of the R, G, B components of the target white point is greater than 255, the R, G, B components of the target white point are divided by the maximum component to obtain the adjustment data on R, G, B components.

When the maximum component of the R, G, B components of the target white point is less than or equal to 255, the R, G, B components of the target white point are divided by 255 to obtain the adjustment data on R, B components.

With this aspect, by comparing the R, G, B components of the target white point directly to 255, the adjustment data on R, G, B components may be obtained quickly.

Accordingly, an electronic device is provided in aspects of the present disclosure, which includes a processor, and a memory for storing instructions executable by the processor. The processor is configured to: obtain target optical parameters for representing a color space of a screen; calculate R, G, B components of a target white point according to the target optical parameters; compare the R, G, B components of the target white point with R, G, B components of a current white point of the screen, and obtain adjustment data on R, G, B components respectively; and adjust R, G, B components of the screen according to the adjustment data on R, G, B components when the screen is displaying.

Accordingly, aspects of the present disclosure also provide a computer-readable storage medium having stored therein computer programs that, when executed by a processor, cause the processor to perform the method according to the above aspects of the present disclosure.

The present disclosure may be achieved in a computer program product implemented in one or more computer-readable mediums (which may include but not be limited to a disk storage, a compact disc read-only memory (CD-ROM), an optical memory, etc.) including executable instructions. The computer-readable medium may be transitory or non-transitory, moveable or un-moveable, which may implement information storage through any method and technique. The information may be computer-readable instructions, data structures, program modules, or other data. Examples of the computer-readable mediums would include, but are not limited to, a phase change memory (PRAM), a static random access memory (SRAM), a dynamic random access memory (DRAM), a random access memory (RAM) with other types, a read-only memory (ROM), an electrically erasable programmable read-only memory (EEPROM), a flash memory or other memory technology, a CD-ROM, a digital versatile disc (DVD) or other optical storage, a magnetic cassette tape, a magnetic tape storage or other magnetic storage device or any other non-transmission medium, which can be configured to store information that can be accessed by the computing device.

With respect to the apparatus in the above aspects, the specific manners for performing operations for individual modules therein have been described in detail in the aspect regarding to the methods, which will not be elaborated here.

Since the apparatus aspects substantially correspond to the method aspects, reference is made to the description of the method aspects as to details not disclosed in the device aspects. The above-described apparatus aspects are merely for the purpose of illustration. Those units described as separated components may be or may not be physically separated; those units described as a display component may be or may not be a physical unit, i.e., either located at one place or distributed onto a plurality of network units. The object of the present disclosure may be achieved by part or all of modules in accordance with practical requirements. It would be appreciated and executable by those skilled in the art without creative labor.

Figure 8:
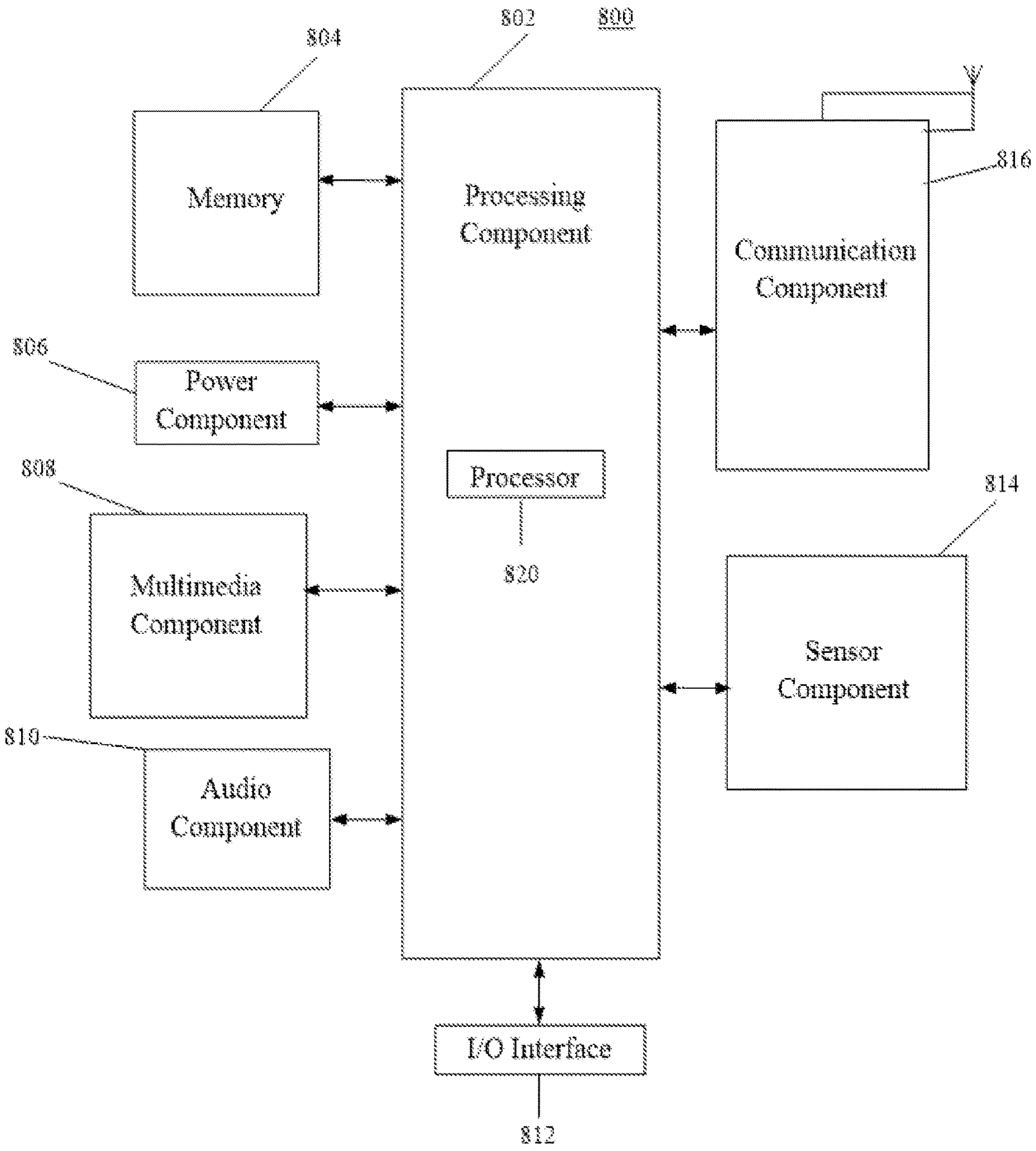
FIG. 8 is a block diagram illustrating an electronic device including an apparatus for adjusting screen color according to an example aspect of the present disclosure.

As illustrated in FIG. 8, FIG. 8 is a block diagram illustrating an electronic device including an apparatus for adjusting screen color according to an example aspect of the present disclosure. Device 800 could be an electronic device with a display screen, such as a mobile phone, a computer, a digital broadcast terminal, a messaging device, a gaming console, a tablet, a medical device, exercise equipment, a personal digital assistant, and the like.

With reference to FIG. 8, device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the acts in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phone book data, messages, pictures, videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some aspects, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some aspects, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WIFI, 2G, or 3G, or a combination thereof. In one exemplary aspect, the communication component 816 receives a broadcast signal or broadcast associated information from an external broadcast management system via a broadcast channel. In one exemplary aspect, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In exemplary aspects, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as the memory 804 including instructions and the instructions are executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

When the instructions stored in the storage medium are executed, the device 800 is caused to perform a method for adjusting screen color, including obtaining target optical parameters for representing a color space of a screen; calculating R, G, B components of a target white point according to the target optical parameters; comparing the R, G, B components of the target white point with R, G, B components of a current white point of the screen, and obtaining adjustment data on R, G, B components respectively; and adjusting R, G, B components of the screen according to the adjustment data on R, G, B components when the screen is displaying.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure. The present disclosure is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for adjusting screen color, comprising:

obtaining target optical parameters for representing a color space of a screen, wherein the target optical parameters are initial target optical parameters obtained from a plurality of registers, wherein each of the plurality of registers is configured in a screen driver;

calculating a target set of R, G, B components of a target white point based on the target optical parameters;

comparing the target set of R, G, B components with a current set of R, G, B components of a current white point of the screen;

obtaining adjustment data for the current set of R, G, B components based on the comparison; and after displaying of the screen, adjusting the current set of R, G, B components of the screen based on the adjustment data for the current set of R, G, B components, wherein obtaining the initial target optical parameters comprises:

reading data stored in the plurality of registers; and restoring the read data to the initial target optical parameters based on a preset strategy that is configured to restore the data stored in the plurality of registers to the initial target optical parameters, the data corresponding to data that is split from the initial target optical parameters to store in a signal register, when a digit number of the initial target optical parameters is greater than a digit number stored in the signal register.

2. The method according to claim 1, wherein the target optical parameters comprise a first chromaticity coordinate when a red color is displaying on the screen, a second chromaticity coordinate when a blue color is displaying on the screen, a third chromaticity coordinate when a green color is displaying on the screen, a fourth chromaticity coordinate when a white color is displaying on the screen, and a gamma value of the screen.

3. The method according to claim 1, wherein the target optical parameters comprise a first chromaticity coordinate and a first luminance value when a red color is displaying on the screen, a second chromaticity coordinate and a second luminance value when a blue color is displaying on the screen, a third chromaticity coordinate and a third luminance value when a green color is displaying on the screen and, a gamma value of the screen.

4. The method according to claim 1, wherein the target optical parameters are obtained by compensating initial target optical parameters obtained from a plurality of registers based on preset compensation parameters, wherein the preset compensation parameters are configured to compensate deviations of the target optical parameters introduced by assembling the screen into an electronic device.

5. The method according to claim 1, wherein a gamma value of the screen in the target optical parameters is preset and other parameters in the target optical parameters are obtained by detecting certain colors displaying on the screen through detection components.

6. The method according to claim 1, further comprising storing the initial target optical parameters in the plurality of registers, and wherein storing the initial target optical parameters in the plurality of registers comprises:

when a decimal part of an x value or a y value in the chromaticity coordinate in the initial target optical parameters has three or four digits and the register is an 8 bit register, splitting the decimal part of the x value or the y value into two 2-digit numbers, and storing the split data in two adjacent registers, wherein the preset strategy comprises combining the split data stored in the two adjacent registers into the x value or the y value of the chromaticity coordinate based on an order of register addresses and an order of parameters in the target optical parameters;

when a decimal part of an x value or a y value in the chromaticity coordinate in the initial target optical parameters after half adjusting has N digits, and the register is an 8 bit register, comparing data of the x value or the y value after half adjusting with a corresponding standard coordinate value, and storing a difference between the data of the x value or the y value after half adjusting and the corresponding standard coordinate value in the register, in which a decimal part of the standard coordinate value has N−1 digits, wherein the preset strategy comprises restoring the data stored in the register into the x value or the y value of the chromaticity coordinate based on an order of the register address, an order of parameters in the target optical parameters, and standard coordinate values; and when the luminance value in the initial target optical parameters is a 3-digit number and the register is an 8 bit register, splitting the luminance value into two 2-digit numbers, and storing the split data in two adjacent registers, wherein the preset strategy comprises combining the split data stored in the two adjacent registers based on an order of the register addresses and an order of parameters in the target optical parameters, so as to restore the luminance value.

7. The method according to claim 1, wherein calculating the target set of R, G, B components of the target white point based on the target optical parameters comprises:

calculating a transformation matrix from tristimulus values to R, G, B components based on the target optical parameters;

transforming chromaticity coordinates of the target white point to tristimulus values of the target white point; and obtaining the target set of R, G, B components of the target white point based on a product of the tristimulus values of the target white point and the transformation matrix.

8. The method according to claim 1, wherein comparing the target set of R, G, B components of the target white point with the current set of R, G, B components of the current white point of the screen, and obtaining adjustment data for the current set of R, G, B components comprises:

when a maximum component of the target set of R, G, B components is greater than 255, dividing the target set of R, G, B components by the maximum component to obtain the adjustment data for the current set of R, G, B components; and when the maximum component of the target set of R, G, B components is less than or equal to 255, dividing the target set of R, G, B components by 255 to obtain the adjustment data for the current set of R, G, B components.

9. An electrical device, comprising:

a processor;

a memory for storing instructions executable by the processor, wherein the processor is configured to:

obtain target optical parameters for representing a color space of a screen, wherein the target optical parameters are initial target optical parameters obtained from a plurality of registers, wherein each of the plurality of registers is configured in a screen driver;

calculate a target set of R, G, B components of a target white point based on the target optical parameters;

compare the target set of R, G, B components with a current set of R, G, B components of a current white point of the screen;

obtain adjustment data for the current set of R, G, B components based on the comparison; and adjust the current set of R, G, B components of the screen based on the adjustment data for the current set of R, G, B components after displaying of the screen, wherein, when obtaining the initial target optical parameters, the processor is further configured to:

read data stored in the plurality of registers; and restore the read data to the initial target optical parameters based on a preset strategy that is configured to restore the data stored in the plurality of registers to the initial target optical parameters, the data corresponding to data that is split from the initial target optical parameters to store in a signal register, when a digit number of the initial target optical parameters is greater than a digit number stored in the signal register.

10. The electrical device according to claim 9, wherein the target optical parameters comprise a first chromaticity coordinate when a red color is displaying on the screen, a second chromaticity coordinate when a blue color is displaying on the screen, a third chromaticity coordinate when a green color is displaying on the screen, a fourth chromaticity coordinate when a white color is displaying on the screen, and a gamma value of the screen.

11. The electrical device according to claim 9, wherein the target optical parameters comprise a first chromaticity coordinate and a first luminance value when a red color is displaying on the screen, a second chromaticity coordinate and a second luminance value when a blue color is displaying on the screen, a third chromaticity coordinate and a third luminance value when a green color is displaying on the screen, and a gamma value of the screen.

12. The electrical device according to claim 9, wherein the target optical parameters are obtained by compensating initial target optical parameters obtained from a plurality of registers based on preset compensation parameters, wherein the preset compensation parameters are configured to compensate deviations of the target optical parameters introduced by assembling the screen into an electronic device.

13. The electrical device according to claim 9, wherein a gamma value of the screen in the target optical parameters is preset and other parameters in the target optical parameters are obtained by detecting certain colors displaying on the screen through detection components.

14. The electrical device according to claim 9, wherein the processor is configured to store the initial target optical parameters in the plurality of registers by:

when a decimal part of an x value or a y value in the chromaticity coordinate in the initial target optical parameters has three or four digits and the register is an 8 bit register, splitting the decimal part of the x value or the y value into two 2-digit numbers, and storing the split data in two adjacent registers, wherein the preset strategy comprises combining the split data stored in the two adjacent registers into the x value or the y value of the chromaticity coordinate based on an order of register addresses and an order of parameters in the target optical parameters;

when a decimal part of an x value or a y value in the chromaticity coordinate in the initial target optical parameters after half adjusting has N digits, and the register is an 8 bit register, comparing data of the x value or the y value after half adjusting with a corresponding standard coordinate value and storing a difference between the data of the x value or the y value after half adjusting and the corresponding standard coordinate value in the register, in which a decimal part of the standard coordinate value has N−1 digits, wherein the preset strategy comprises restoring the data stored in the register into the x value or the y value of the chromaticity coordinate based on an order of the register address, an order of parameters in the target optical parameters, and standard coordinate values; and when the luminance value in the initial target optical parameters is a 3-digit number and the register is an 8 bit register, splitting the luminance value into two 2-digit numbers, and storing the split data in two adjacent registers, wherein the preset strategy comprises combining the split data stored in the two adjacent registers based on an order of the register addresses and an order of parameters in the target optical parameters, so as to restore the luminance value.

15. The electrical device according to claim 9, wherein the processor is configured to calculate the target set of R, G, B components of the target white point based on the target optical parameters by:

calculating a transformation matrix from tristimulus values to R, G, B components based on the target optical parameters;

transforming chromaticity coordinates of the target white point to tristimulus values of the target white point; and obtaining the target set of R, G, B components of the target white point based on a product of the tristimulus values of the target white point and the transformation matrix.

16. The electrical device according to claim 9, wherein the processor is configured to compare the target set of R, G, B components of the target white point with the current set of R, G, B components of the current white point of the screen, and obtain adjustment data for the current set of R, G, B components by:

when a maximum component of the target set of R, G, B components is greater than 255, dividing the target set of R, G, B components by the maximum component to obtain the adjustment data for the current set of R, G, B components; and when the maximum component of the target set of R, G, B components is less than or equal to 255, dividing the target set of R, G, B components by 255 to obtain the adjustment data for the current set of R, G, B components.

17. A non-transitory computer-readable storage medium having stored therein instructions that, when executed by a processor of a terminal, causes the terminal to perform a method for adjusting screen color, which comprises:

obtaining target optical parameters for representing a color space of a screen, wherein the target optical parameters are initial target optical parameters obtained from a plurality of registers, wherein each of the plurality of registers is configured in a screen driver;

calculating a target set of R, G, B components of a target white point based on the target optical parameters;

comparing the target set of R, G, B components with a current set of R, G, B components of a current white point of the screen;

obtaining adjustment data for the current set of R, G, B components based on the comparison; and after displaying of the screen, adjusting the current set of R, G, B components of the screen based on the adjustment data for the current set of R, G, B components, wherein obtaining the initial target optical parameters comprises:

reading data stored in the plurality of registers; and restoring the read data to the initial target optical parameters based on a preset strategy that is configured to restore the data stored in the plurality of registers to the initial target optical parameters, the data corresponding to data that is split from the initial target optical parameters to store in a signal register, when a digit number of the initial target optical parameters is greater than a digit number stored in the signal register.

* * * * *